United States Patent [19]
Carlson

[11] 3,874,497
[45] Apr. 1, 1975

[54] SANITARY SIDE GUIDE RAIL FOR CONVEYOR

[76] Inventor: Kenneth G. Carlson, 11350 N. Valley Dr., 18 W., Mequon, Wis. 53092

[22] Filed: July 2, 1973

[21] Appl. No.: 375,410

Related U.S. Application Data

[63] Continuation-in-part of Ser. No. 161,839, July 12, 1971, abandoned.

[52] U.S. Cl. .............................................. 198/204
[51] Int. Cl. ............................................ B65g 15/60
[58] Field of Search ..................... 198/204, 160, 137

[56] References Cited
UNITED STATES PATENTS

| | | | |
|---|---|---|---|
| 2,706,034 | 4/1955 | Russell et al. | 198/204 |
| 2,837,203 | 6/1958 | Reeser | 198/204 |
| 3,193,077 | 7/1965 | Goldberg | 198/204 |
| 3,280,962 | 10/1966 | Stone et al. | 198/204 |
| 3,313,400 | 4/1967 | Johnson | 198/204 |
| 3,508,642 | 4/1970 | Standley et al. | 198/204 |
| 3,581,877 | 6/1971 | Goldberg | 198/204 |
| 3,647,051 | 3/1972 | Didas | 198/204 |

Primary Examiner—Richard A. Schacher
Assistant Examiner—Jeffrey V. Nase
Attorney, Agent, or Firm—Henry C. Fuller

[57] ABSTRACT

Sanitary guide rails for an empty can cable track or a flat top conveyor have co-planar guiding flanges which are connected to an offset web portion by converging channel wall portions to provide a structure with no dirt accumulating recesses or corners. One end of the guide rails is offset and the adjacent ends are lapped to provide a continuous and co-planar guiding surface. The guide rails are supported by the legs of an adjustable yoke. Rotation of a threaded yoke adjustment rod with spaced right and left hand threaded portions threadably received in the opposed yoke legs enables simultaneous movement of the yoke legs in opposite directions for quickly changing the spacing of the guide rails.

5 Claims, 10 Drawing Figures

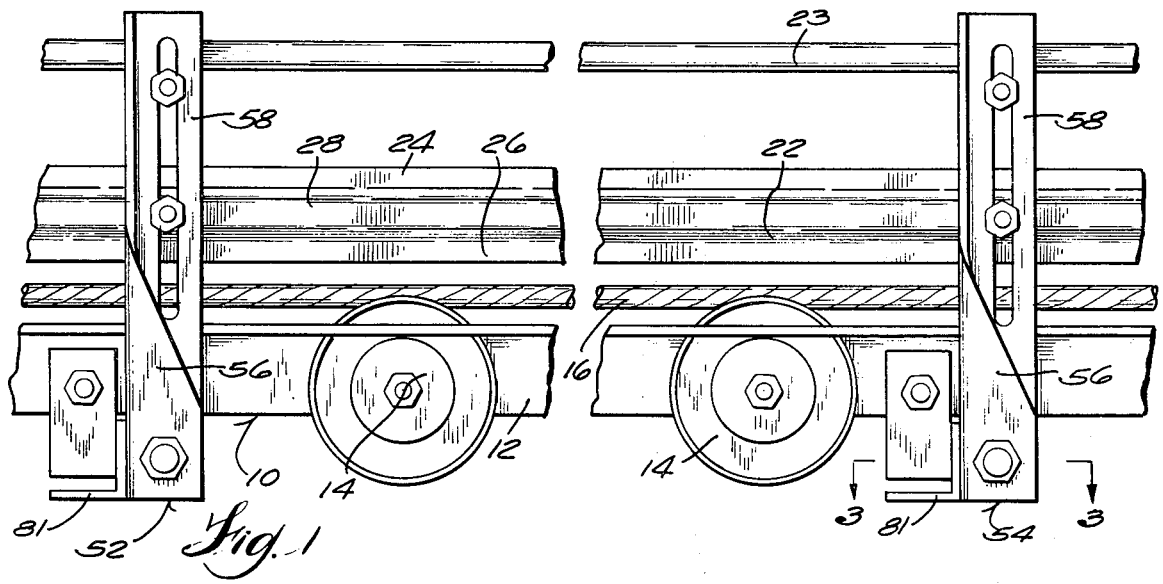
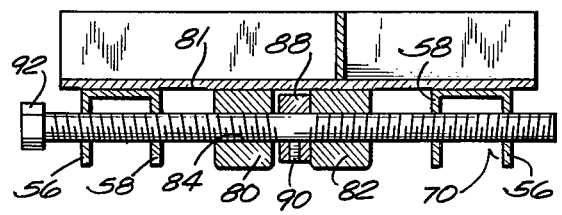
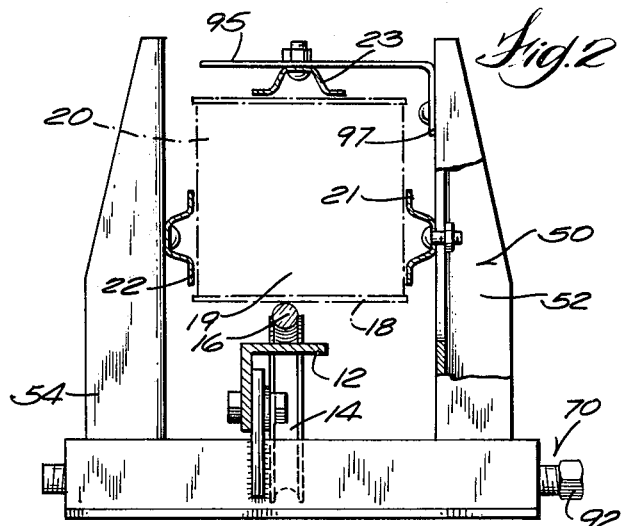
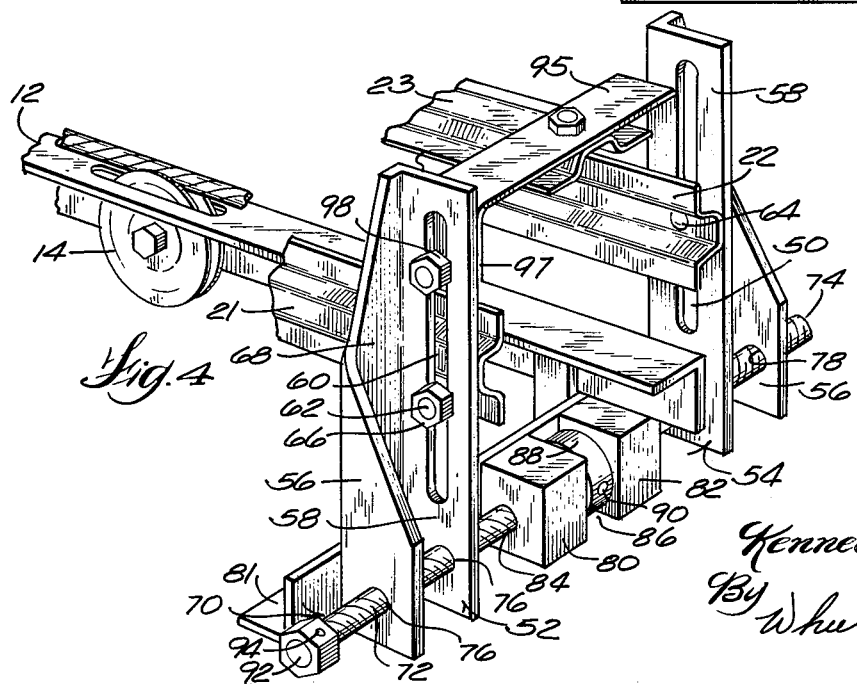
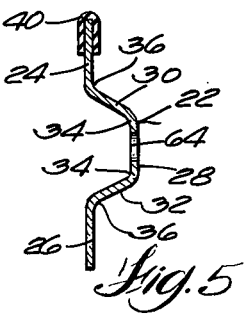

SANITARY SIDE GUIDE RAIL FOR CONVEYOR

CROSS REFERENCE TO RELATED APPLICATION

This application is a continuation-in-part application of application Ser. No. 161,839, filed Jul. 12, 1971, now abandoned.

BACKGROUND OF INVENTION

Prior art guide rails for empty can conveyors have a generally C-shaped configuration which accumulates dust, dirt and foreign matters during use and thus are unsanitary.

SUMMARY OF INVENTION

The invention provides a sanitary guide rail configuration for empty or full can conveyors in which the guide rails are preferably constructed of steel and completely coated with an electrostaticly applied plastic coating and have co-planar spaced guiding surfaces or flanges interconnected by converging channel legs or walls which extend from a central web portion which is offset from the guiding surfaces and perforated to receive fasteners for connecting the guide rails to adjustable guide rail mounting yokes. The coverging channel walls present no sharp corners to retain or accumulate foreign particles or dirt.

The adjustable mounting yoke of the invention affords quick adjustment of the spacing of the side rails located on opposite sides of the conveyor feed path to accommodate various sized cans. The mounting yoke comprises two upstanding yoke legs one for each of the opposed guide rails, and a threaded adjustment rod having spaced threaded portions with the threads on one portion running in a direction counter to the threads on the other portion. The threaded portions are received in threaded apertures in each of the legs. The adjustment rod is supported by spaced mounting blocks with through apertures. A collar fixed to the rod and located intermediate the mounting blocks limits axial movement of the adjustment rod.

A nut is secured by a cross pin to one end of the threaded adjustment rod after assembly of the yoke legs and is easily rotated by a wrench to afford simultaneous movement of the yoke legs and thus the guide rails in opposite directions to obtain suitable guide rail spacing for different diameter cans.

Further objects, features and advantages of the present invention will become apparent from the following disclosure.

DRAWINGS

FIG. 1 is a fragmentary side elevational view of a can conveyor embodying the guide rails and adjustable mounting yoke of the invention.

FIG. 2 is an end view of the conveyor shown in FIG. 1.

FIG. 3 is a sectional view along line 3—3 of FIG. 1.

FIG. 4 is a fragmentary side and end perspective view of the conveyor shown in FIGS. 1 and 2.

FIG. 5 is an enlarged sectional view of a guide rail in accordance with the invention.

DESCRIPTION OF PREFERRED EMBODIMENT

Figure 6:
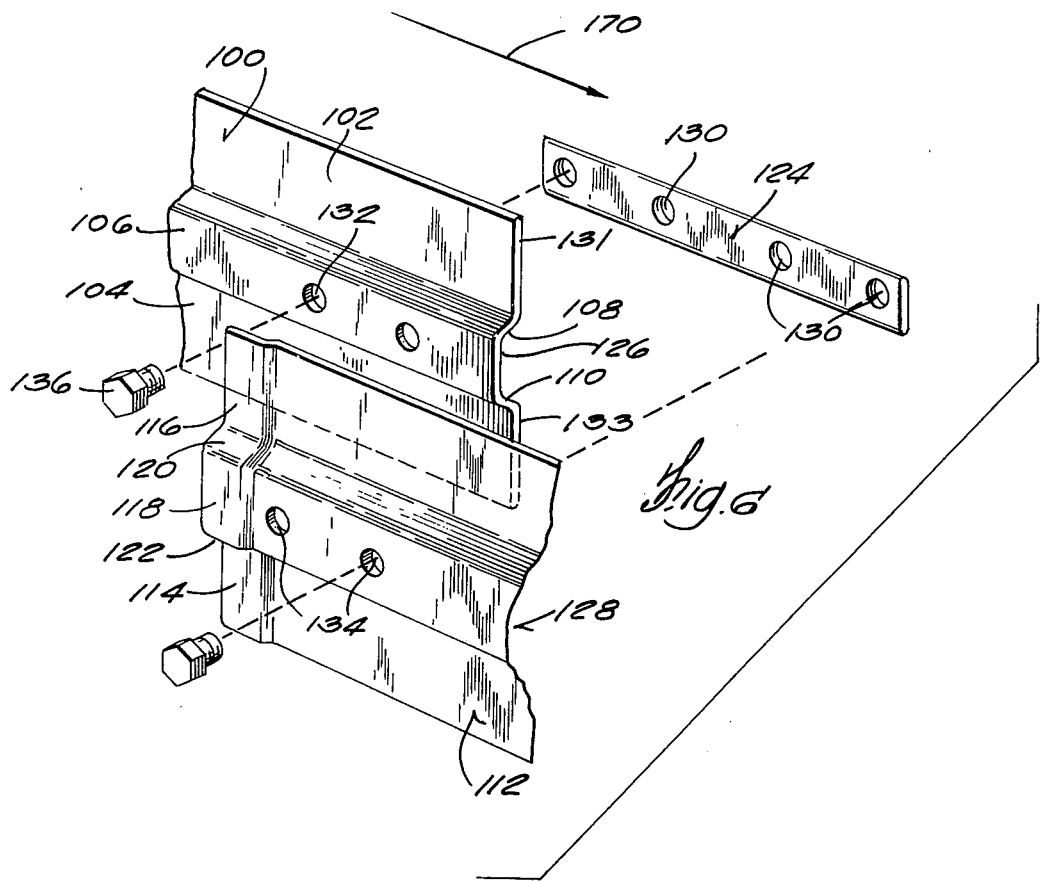
FIG. 6 is a fragmentary perspective view of a modified embodiment of the guide rail showing the parts in spaced relation.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 discloses an empty can conveyor 10 which includes a pulley support and cable track 12 which extends longitudinally of the conveyor for supporting spaced cable pulleys 14 which guide an endless cable 16 which contacts the bottoms 18 of empty cans 20 (FIG. 2) to propel the cans 20 along the conveyor 10. The conveyor 10 includes spaced side guide rails 21, 22 which extend longitudinally of the conveyor on opposite sides of the can feed path 19 and a top guide rail 23.

As shown in FIG. 5 the guide rails 21, 22, 23 include first and second co-planar rail portions or guiding flanges 24, 26, a web portion 28 and inwardly converging channel walls or legs 30 and 32 which connect the flanges 24 and 26 with the channel web portion 28. The angles of the channel walls 30, 32 with the guiding flanges 24, 26 and on the web 28 result in smooth corners or junctures 34 and 36 with no horizontal surfaces to accumulate dirt or foreign particles as with prior art guide rails.

The use of two spaced guiding flanges causes less drag on the cans than a single continuous guiding surface of the same width. The guiding flanges 24 and 26 are also adapted to receive U-shaped Nylatron strips 40 which minimize friction, marring of the surface of the cans and deaden sound resulting from contact of the cans with the guide rails.

In accordance with the invention means are provided for adjustably mounting the side guide rails 21, 23 to provide simultaneous movement in opposite directions to adjust the spacing between the guide rails for various size cans.

In the disclosed construction, the means comprises an adjustable yoke 50 having brackets or yoke legs 52 and 54. The yoke legs 52, 54 desirably comprise upstanding channel members having opposed channel walls 56, 58 with a slot 60 in wall 58 for adjustably receiving a bolt or fastener 62 which extends through a mounting aperture 64 in the web portion 28 of the guide rail. The slots 60 afford vertical adjustment of the side guide rails for cans of different heights. A portion of the wall 56 is cut away opposite the slot 60 to facilitate access to the fastener 62. The channel web portion 68 is tapered downwardly to merge with the wall 56.

The means for adjustably mounting the side guide rails 21, 23 includes an adjustment rod 70 having first and second spaced threaded portions 72 and 74 with the threads on the threaded portion 74 running counter to the direction of the threads on the threaded portion 72. The threaded portion 72 is threadably received in threaded apertures 76 in flanges 56 and 68 and the threaded portion 74 is threadably received in threaded apertures 78 in the flange walls 56, 58 of yoke leg 54. The adjustment rod 70 is freely rotatably supported by spaced mounting blocks 80, 82 which are secured to a cross member 31 which is fixed to the pulley support. The mounting blocks have co-axial aperture 84 for receiving the rod 70. The mounting blocks are spaced by a gap 86. To limit axial movement of the adjustment rod 70 a collar 88 is located in the gap 86 and fixed to the threaded member 70 by a set screw 90. A nut 92 is threaded on the adjustment rod 70 after the rod 70 is inserted in the yoke legs 52, 54, and secured by a cross pin 94. Rotation of the nut 92 with a suitable wrench thus effects simultaneous inward or outward movement of the side guide rails 21, 22.

The top rail is supported by a right angle bracket 95 which has a depending leg 97 adjustably secured to a channel wall 58 by a fastener 98 which extends through the slot 60.

Although the guide rail and adjustable mounting yoke as disclosed, are embodied in a can cable track conveyor, they can also be employed in flat top conveyors with a hinged flat top chain with a wide conveying surface.

FIG. 6-10 show a guide rail construction in which the end of one guide rail is laterally offset and receives in overlapping relation the end of the adjoining guide rail to provide a substantially continuous co-planar guiding surface. More specifically, FIG. 6 shows a portion of a guide rail 100 with upper and lower spaced flanges 102 and 104 which are connected by a web portion 106 and converging wall portions 108 and 110. The guide rail section 112 is provided with outwardly offset flange portions 114, 116, and outwardly offset web portion 118 and converging wall portions 120 and 122 which are spaced to receive the web portion and converging wall portions 106, 108 and 110 of the guide rail section 100. Means are provided for securing the lapped ends of the guide rail sections 100 and 112 together. In the construction disclosed in FIG. 6, the means includes a fastening bar or member 124 which is sized to interfit in the channels 126 and 128 of the rail sections 100 and 112. The fastening bar 124 is provided with a plurality of threaded apertures 130. The apertures 130 register with apertures 132 and 134 respectively in guide rail sections 100 and 112. Bolts 136 extend through the apertures 132 and 134 and are threadably received in apertures 130 in the fastening bar. The fastening bar 124 is of a thickness such that it is received within the channel in a recessed position to avoid interference with containers carried along the guiding surfaces 131, 133 of the guide rails.

Figure 7:
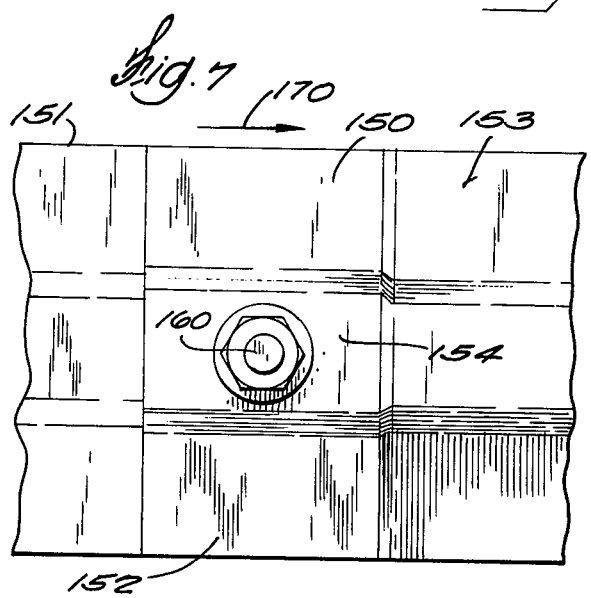
FIG. 7 is a fragmentary plan view of an additional embodiment of a guide rail.
Figure 9:
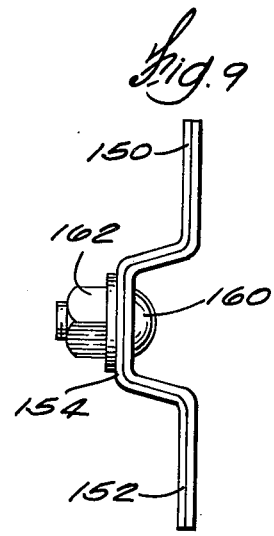
FIG. 9 is a view along line 9—9 of FIG. 7.
Figure 8:
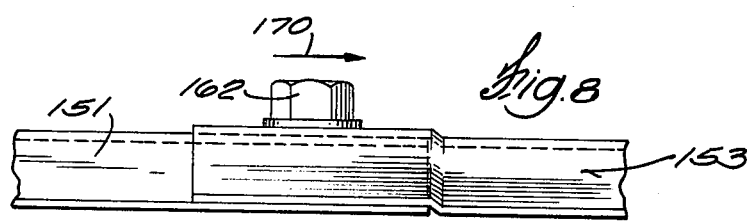
FIG. 8 is a plan view of the embodiment shown in FIG. 7.

FIG. 7, 8 and 9 show a modified embodiment in which the offset portions of the flanges 150, 152 and the offset portion of the web 154 of guide rail 153 have a greater longitudinal length than that shown in the FIG. 6 embodiment. In the embodiment shown in FIGS. 7-9, the means for fastening the lapped ends of adjoining guide rail sections 151, 153 includes registerable apertures in the web portions 154 of the lapped ends and a bolt 160 and nut 162 which clamps the guide rails together.

Figure 10:
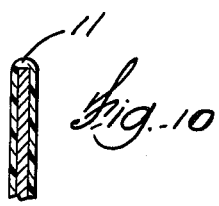
FIG. 10 is an enlarged fragmentary sectional view of the guide rail shown in FIG. 7.

As shown in FIG. 10, the guide rails can be completely coated electrostaticly with a substance such as nylon 11 to provide a quiet and sanitary conveying system.

In use, the guide rails are arranged so that the direction of flow of the containers is as shown by arrows 170. Thus the containers do not hit the end of the guide rail which is recessed in the adjoining guide rail.

What is claimed is:

1. A guide rail construction for an empty can conveyor or the like comprising at least two guide rails having two parts, both of said parts having first and second spaced co-planar flanges, a web portion located intermediate said first and second flanges and offset from said flanges and inwardly converging wall portions connecting said web portion with said flanges and defining a channel, one of said parts having first and second spaced flanges, said web portion and said flanges being offset laterally from the other of said parts at an end of said guide rails a distance sufficient to receive the end of an adjoining guide rail so that the flanges of both of said adjoining guide rails are co-planar and provide a substantially continuous vertical guiding surface, means for connecting said overlapped ends of said adjoining guide rails, and means for supporting said guide rails with the co-planar flanges in a generally vertical orientation.

2. A guide rail construction in accordance with claim 1 wherein said means for securing the overlapped ends of adjoining guide rails together comprises a fastening member located within said channels and spanning the ends of both of said adjoining guide rails, apertures in said web portions and bolts extending through said apertures and threadably received in apertures in said fastening member.

3. A guide rail construction in accordance with claim 1 wherein said means for fastening adjoining ends of said guide rails comprises registerable apertures in lapped web portions of said adjoining guide rails and a bolt extending through said apertures clamping said lapped ends together.

4. A guide rail construction in accordance with claim 1 wherein said guide rails are coated with plastic.

5. Conveying apparatus for containers comprising conveying means, a pair of spaced side guide rails having guiding surfaces and located on opposite sides of the path of travel of the containers, and means connected to said guide rails to afford simultaneous movement of said guide rails in opposite directions to vary the spacing of said guide rails and wherein said means connecting said guide rails comprises first and second brackets in the form of U-shaped channels having inner and outer spaced opposed flanges parallel to the guiding surfaces of said guide rails, an adjustment member having a first threaded portion with right hand threads and a second threaded portion with left hand threads, threaded apertures in said spaced flanges of said first and second brackets for threadably receiving said first and second threaded portions, a mounting member adapted to be secured to a support, an aperture in said mounting member freely receiving said adjustment member, and retaining means cooperating with said mounting member to limit axial movement of said adjustment member the inner of said flanges having a slot adapted to adjustably receive a fastener secured to one of said guide rails for adjustably positioning the height of said guide rail, a fastener extending through said slot, and the outer of said flanges having a length less than said inner flange with the slot to expose said slot and said fastener for access for manual manipulation and wherein each of said spaced wall portions has a threaded aperture for threadably receiving said adjustment member.

\* \* \* \* \*